United States Patent [19]

Rogers et al.

[11] Patent Number: 4,765,410
[45] Date of Patent: Aug. 23, 1988

[54] METHOD AND APPARATUS FOR CLEANING WELLS

[76] Inventors: William C. Rogers, 2301 Bryant Dr., East Point, Ga. 30344; George W. Alford, III, 1954 Old Datona Rd., Daytona Beach, Fla. 32014; D. Roy Cullimore, 2003 Styles Crecent East, Regina, Saskatchewan S4V 0P8, Canada

[21] Appl. No.: 65,916

[22] Filed: Jun. 24, 1987

[51] Int. Cl.$^4$ .............................................. E21B 43/27
[52] U.S. Cl. ..................... 166/303; 166/57; 166/312
[58] Field of Search ............... 166/303, 307, 309, 57

[56] References Cited

U.S. PATENT DOCUMENTS

| | | | |
|---|---|---|---|
| 3,482,636 | 12/1969 | Crowe | 166/312 X |
| 3,547,194 | 12/1970 | Morine | 166/312 X |
| 4,353,417 | 10/1982 | Widmyer | 166/303 X |

FOREIGN PATENT DOCUMENTS

| | | | |
|---|---|---|---|
| 0133015 | 2/1960 | U.S.S.R. | 166/312 |
| 0685813 | 9/1979 | U.S.S.R. | 166/312 |

Primary Examiner—Jerome Massie, IV
Assistant Examiner—William P. Neuder
Attorney, Agent, or Firm—James B. Middleton

[57] ABSTRACT

A method and apparatus for cleaning a well wherein chemicals are applied to the well screen with steam. The well screen may be first washed with a sterilizing agent, and subsequently a chemical mix is added to the steam. The chemical mix includes a sterilizing agent, an acid, and perhaps a surfactant. The well is capped during treatment so the well becomes pressurized; and, the chemical mix is forced out beyond the well screen. The surfactant aids in penetrating the clog, while the sterilizing agent kills any plant or animal life that is causing or contributing to the clog. Some sterilizing agent may remain to prevent regrowth of life forms that may feed on other chemical components. The well may be surged to assist further in breaking up the mass clogging the well.

14 Claims, 1 Drawing Sheet

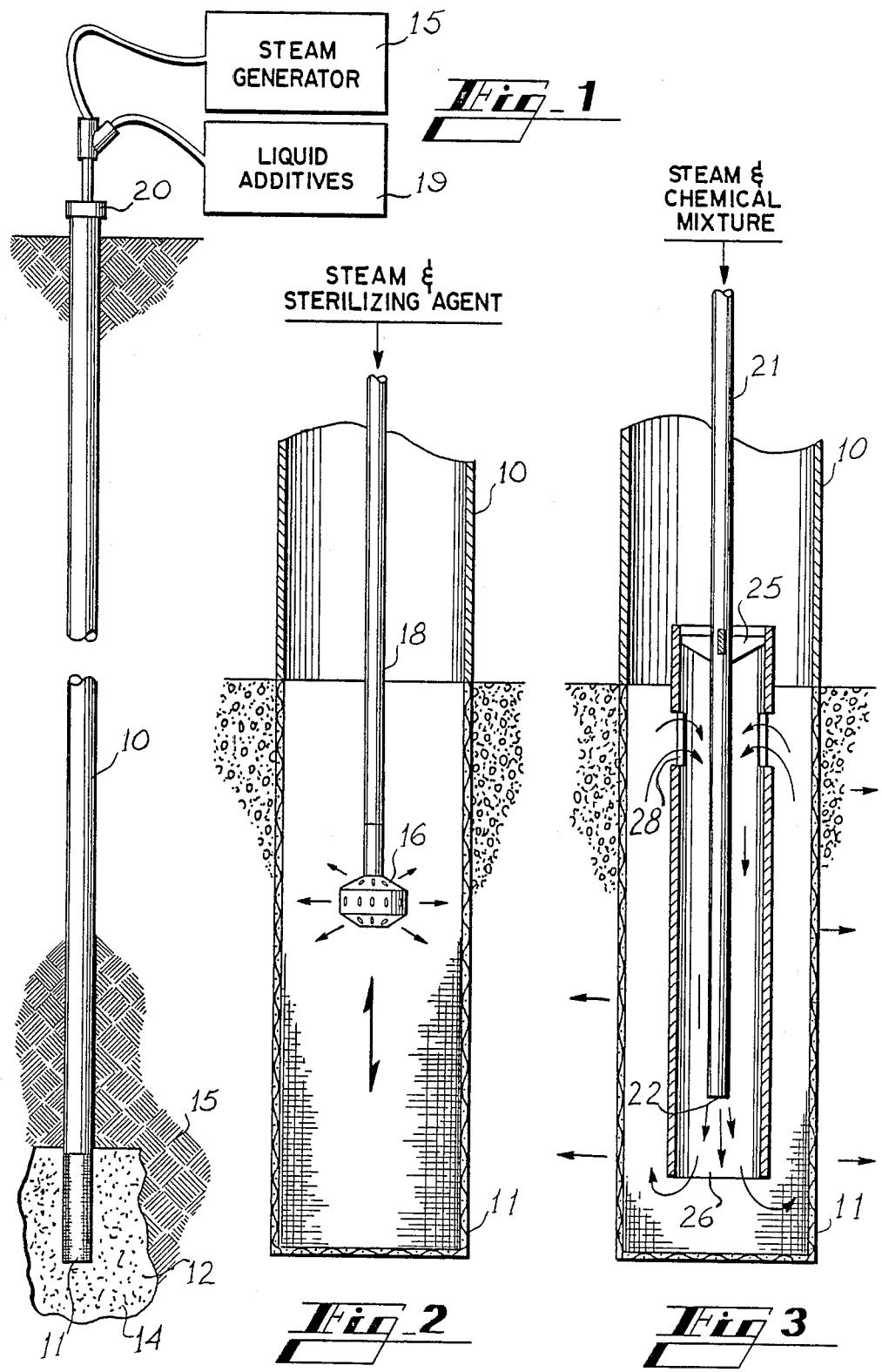

METHOD AND APPARATUS FOR CLEANING WELLS

INFORMATION DISCLOSURE STATEMENT

It is known that many wells become clogged so that liquid does not easily flow to or from the well. It is also known that, in some of these wells, bacteria form a mass that, at least partially, blocks the flow. However, there is usually an assumption that any bacterial blockage is in conjunction with other materials such as paraffin, clay, various chemical precipitates such as carbonates and the like.

The prior art methods and apparatus for cleaning wells have usually taken the form of a solution pumped or otherwise discharged into the well. The solutions have included chlorine-bearing liquids such as sodium hypochlorite to kill bacteria, and have included alkaline salts. Sometimes the solutions have been heated, especially for meltable substances such as paraffin. U.S. Pat. No. 3,482,636 to Crowe, for example, discloses a method for cleaning a well that is blocked by a combination of bacterial slimes, algae and synthetic polymers. The method includes the use of a hypohalite, such as sodium hypochlorite, mixed with an alkali, such as sodium hydroxide, to solubilize material and open the pores in the earth surrounding the well, the hypohalite being followed by an acid, such as hydrochloric acid. This patent relies on the assumption that the blockage is a mixture of several substances, and relies very heavily on the chemical action to remove the blockage.

In spite of patents such as the above mentioned Crowe patent, there is no known method for opening wells such as water wells, relief wells, injection wells and the like, and maintaining the wells open for an extended period of time. The prior art systems result in only partial opening in the first place, and the wells tend to reclog very soon.

SUMMARY OF THE INVENTION

This invention relates generally to a method and apparatus for cleaning wells, and is more particularly concerned with a method and apparatus for destroying a bacterial coating causing occlusion of a well.

The present invention provides a method and apparatus for opening a well, and cleaning the well sufficiently that the well will remain open for an extended period of time. The method includes the steps of washing the well interior with a sterilizing agent for preliminary sterilization, and subsequently capping the well and injecting steam carrying a chemical mixture. The fact that the well is capped causes pressure to build up within the well and force the chemical mixture outwardly into the gravel pack around the well, and into the surrounding earth. The method therefore opens not only the immediate vicinity of the well, but also some surrounding area.

The preliminary sterilizing agent may be any of numerous materials, but a chlorine-bearing material is generally effective and safe. The chemical mixture for use with the pressurized treatment includes a sterilizing agent, and also includes an acid, and may further include a surfactant. The combination of the chemicals penetrates the material causing the clog. The heat and pressure in conjunction with the chemicals tend to dislodge the material; and, the convective currents in conjunction with the pressure cause a general flowing of the material so the material can be removed from the site. It has been found that the well is very free-flowing after treatment, and does not show reclogging quickly, and it is thought that some chemical remains in the earth to assist in keeping the area open.

BRIEF DESCRIPTION OF THE DRAWINGS

These and other features and advantages of the present invention will become apparent from consideration of the following specification when taken in conjunction with the accompanying drawings in which:

FIG. 1 is a cross-sectional view of the earth showing a well being cleaned in accordance with the method of the present invention;

FIG. 2 is an enlarged cross-sectional view through the well screen area of the well shown in FIG. 1, and illustrating the preliminary sterilizing of the well; and, FIG. 3 is a view similar to FIG. 2 showing the final chemical treatment in accordance with the present invention.

DETAILED DESCRIPTION OF THE EMBODIMENT

Referring now more particularly to the drawings and to that embodiment of the invention here presented by way of illustration, it will be realized that the well illustrated in FIG. 1 of the drawings is typical of a water well, but the inventive method is applicable to many forms of well. Looking at FIG. 1, however, it will be realized that the well includes a well casing 10 that is typically a steel pipe, and a screen 11 at the lower end of the well, which is again steel or the like. Most commonly, the well casing 10 and the screen 11 are galvanized steel, so that both iron and zinc are present. Since certain bacteria feed on these metals, the well provides a center for growth of several forms of bacteria.

In the examination of wells, it has been found that a mass of bacteria will grow substantially at the well screen 11. As the mass grows, it develops a polymeric covering, or skin, around the mass. Thus, in the prior art techniques of applying chlorine or other bactericides, some relatively few of the bacteria may be killed; but, the killed bacteria simply add to the covering or skin to protect the remainder of the bacteria even better.

When a well is first drilled, it should be recognized that the presence of the well allows more oxygen to the subterranean area than has previously been available. This fact in conjunction with the presence of the iron and other metals facilitates the growth of aeorobic bacteria. Growth is therefore greatly enhanced whereas the growth rate may have previously been quite slow. Since the aerobic bacteria form a mass contained within a sac of a tough polymeric material, an adjacent layer may be deprived or oxygen. Rather than becoming a solution to the problem, however, the adjacent layer becomes an area of growth for anaerobic bacteria. The process may continue so that successive layers contain aerobic bacteria, than anaerobic bacteria.

From the foregoing discussion, it should be realized that the bacterial mass or coating will be attached to the well screen 11, and will extend generally throughout the gravel pack 14 which is intended to keep the area porous. The bacteria will further extend out into the surrounding earth 15, which may be the aquifer from which water is to be obtained. While the bacterial coating itself may be the initial problem, and the sustaining cause of the problem, it will be understood by those skilled in the art that the bacteria produce additional contaminants, such as ferric oxide in the case of iron bacteria, to exacerbate the problem.

With the above in mind, attention is directed to FIG. 2 of the drawings in conjunction with FIG. 1. It is contemplated that a steam generator 15 will be used at the top side of the well to provide steam, preferably superheated to some extent as will become better understood hereinafter. The steam will be used as the carrier for other materials to be discharged into the well, the arrangement shown being in the nature of a vanturi, though it will be understood that the liquid treatment chemicals can be pumped at a metered rate if desired. The result to be achieved is the mixing of the selected chemical with the steam for treatment of the well. Obviously too, a down-hole steam generator may be used if desired, and the method will remain the same.

The initial treatment of the well is shown in FIG. 2 wherein a barrel washer 16 is carried at the end of the supply tube 18. With the barrel washer 16 in place, the liquid additive 19 will be a sterilizing agent. The sterilizing agent is preferably a chlorine-bearing material, and solutions that have been tested include sodium hypochlorite and chlorine gas dissolved in water. With the sterilizing agent being dispensed through the supply tube 18, the tube 18 is moved vertically, reciprocally, to wash the inside of the well screen 11. During this treatment, the cap 20 on the well will be vented so the action takes place approximately at normal pressure of the well.

Use of the barrel washer as shown is not critical to the practice of the present invention, but it will be seen that the device shown will distribute the sterilizing agent very widely on the well screen 11 as the device 16 is reciprocated within the well. Other nozzle arrangements can be substituted as desired.

The preliminary sterilization shown in FIG. 2 of the drawings will tend to kill orgamisms that are inside the screen 11, or immediately at the exterior side of the screen. This simply prepares the well for the next, thorough, treatment, and for this treatment attention is directed to FIG. 3 of the drawings.

In FIG. 3 the supply pipe is designated at 21, and the pipe 21 is open at its lower end 22 for discharge of fluids therefrom. The pipe 21 carries a concentric member 24, the member 24 being here shown as supported from the pipe 21 by a plurality of struts 25. While the struts 25 are here shown only at the top of the member 24, it will be readily understood that additional struts or other support members may be used if required, the important feature being to allow fluid flow between the pipe 21 and the member 24.

The pipe 21 terminates within the member 24, which is to say that the fluid from the pipe 21 is discharged above the open end 26 of the member 24. Adjacent to the upper end of the member 24, there are windows 28 opening through the member 24 for allowing fluid to enter the member 24 from the within the well.

With the above described apparatus in mind, the method for use should be understandable. The steam generator 15 will be used, and the liquid additives 19 will consist of a mixture of an acid, a sterilizing agent and, if needed for the particular well, wetting agents or surfactants. This particular mix is important because of the problem to be attacked which is discussed above.

An acid is needed because one of the problems encountered is ferric oxide, and an acid attacks this substance quite well. In addition, the bulk of th material to be removed tends to be more soluble in a lower pH. The sterilizing agent is needed as with the preliminary treatment to kill any life forms that may be present, including the bacteria that probably constitute the principal problem. Finally, the surfactant is needed in some cases to penetrate the mass causing the blockage, though in some environments the surfactant will not be required.

If the well is in an area of limestone, the surfactant may be unnecessary because the acid will attack the limestone to such an extent that the clog will be broken up because the supporting limestone will be broken up. Other particular environments may not require a surfactant, though of course the surfactant will be used in heavy clay and the like.

As was discussed above, a colony of iron bacteria or similar bacterial masses will grow and produce a polymeric covering that protects the bacteria from harm. Even treatment with rather strong doses of chlorine or other bactericides will only shock the mass and kill a small percentage of the bacteria in the mass. The coveirng will then become thicker and harder to penetrate. In this event, the present invention may utilize a surfactant to assist in penetrating the covering and obtaining thorough wetting of the entire bacterial mass.

Those skilled in the art will understand that sulfamic acid, or amidosulfonic acid ($H_2N-SO_3H$), is known as as a cleaning agent, and it has the additional advantage of tending to stabilize chlorine. Sulfamic acid is therefore the preferred acid for use in the present invention, though other acids such as oxalic or the like may be satisfactory. The sterilizing agent is preferably chlorine, especially for use in water wells since chlorine is safe for use in potable water, though other sterilizing agents may be used where human consumption is not contemplated. The surfactants used may be phosphates or any of numerous other well known surfactants, depending on the precise conditions in the well to be cleaned.

Now, with the above discussed mixture as the liquid additive 19, the steam generator 15 will be used to inject steam and carry the additive 19 into the well. In case a down-hole steam generator is used, the additives will be added to the steam within the well. The cap 20 will be in place so the well will be pressurized. As the steam is ejected from the end 22 of the pipe 21, it will be recognized that a lower pressure will be established within the member 24 above the end 22. The member 24 will be filled with fluid, so a current will be established as shown by the arrows. Fluid will move from the pipe 21, down through the open end of the member 24, and be deflected around the outside of the member 24 because of the confinement within the screen 11. Fluid will then enter the windows 28 in the member 24 and move downwardly.

Remembering that the pipe 21 supplies steam with the additives entrained therein, it will be understood that the environment will be heated by the recirculation of the fluid. Thus, as additional steam is injected into the well, the pressure increases and the temperature increases. The above named chemicals will be effective at ambient temperatures, but the activity is of course increased at elevated temperatures. The optimum range appears to be between 55° and 95° C. above ambient temperature, though success has been achieved as low as 20° C. above ambient temperature. The only upper limit is the limit of the stability of the chemicals involved, and this is beyond any practicable physical limit.

The combination of the chemical treatment with the heat and pressure will penetrate a mass clogging the well and fragment and polymeric covering that normally protects the bacteria within the mass. Once the sterilizing agent thoroughly wets the entire mass, the bacteria will be effectively killed. Because of the pressure in the well, the chemicals will be forced outwardly, through the gravel pack 14 and somewhat out into the surrounding earth 15. The sterilizing agent will be carried out into the earth, and the residual sterilizing agent will continue to prevent bacterial growth. This is thought to contribute to the maintaining of the well for an extended period of time after the cleaning.

Even beyond the simple pressure outward, the use of a surging technique will greatly improve results. In general terms, pressure is applied and released so fluid flows out and back. This surging assists in breaking up blocking material for thorough cleaning. Tests indicate that particle sizes are smaller after surging, so reclogging will be less likely.

It will now be seen that the present invention provides a relatively simple method and apparatus for cleaning wells. While the disclosure is directed largely to water wells wherein water is withdrawn from the aquifer, the invention is equally adapted to use in relief wells, such as toe wells in dams, in recovery wells wherein a well is drilled to recover spilled material, and in injection wells wherein waste is injected into the ground for disposal. In all cases, the well must remain free and unclogged for continued use of the well, and the present invention provides a highly desirable system.

It will also be understood that the well will first be sampled to determine the particular form or forms of bacteria infecting the well, and the chemical mix will be varied to be most effective on the particular strains present.

It will therefore be understood by those skilled in the art that the particular embodiment of the invention here presented is by way of illustration only, and is meant to be in no way restrictive; therefore, numerous changes and modifications may be made, and the full use of equivalents resorted to, without departing from the spirit or scope of the invention as outlined in the appended claims.

We claim:

1. A method for opening a clogged well including the steps of placing a steam line into said well, said steam line terminating generally at the bottom of said well, adding a chemical mix into said steam line, and injecting steam with said chemical mix into said well through said steam line, continuing the step of injecting steam with said chemical mix until the temperature in said well is at least 20° C. above ambient temperature, said chemical mix comprising a sterilizing agent and an acid.

2. A method as claimed in claim 1, and further including the step of capping said well so that the said step of injecting steam into said well raises the pressure within said well.

3. A method as claimed in claim 2, and including the step of placing a sleeve around the end of said steam line, said sleeve defining openings at the upper end thereof so that fluid in said well recirculates from the lower end of said sleeve and into said openings in the super end thereof.

4. A method as claimed in claim 3, and further including the step wherein said steam line is placed into said well, a sterilizing agent is added to said steam, and said steam with said sterilizing agent is directed against the well screen prior to the said step of adding said chemical mix to said steam.

5. A method as claimed in claim 4, wherein the said step of directing said steam with said sterilizing agent against said well screen is carrried out by reciprocating a nozzle within said well discharging said steam and sterilizing agent.

6. A method as claimed in claim 1, wherein said acid is sulfamic acid and said sterilizing agent is a chlorine-bearing material.

7. A method as claimed in claim 6, wherein said sterilizing agent is selected from the group consisting of sodium hypochlorite and chlorine gas dissolved in water.

8. A method as claimed in claim 7, wherein said chemical mix comprises 60% sulfamic acid, 40% chlorine-bearing liquid material, and a surfactant dissolved in the liquid.

9. A method as claimed in claim 8, wherein said step of injecting steam into said well is continued until the temperature is between 55° C. and 95° C. above ambient temperature.

10. A method as claimed in claim 8, wherein said step of injecting steam into said well is continued until the temperature is at least 55° C. above ambient temperature.

11. Apparatus for cleaning a well, said well including a well casing, and a well screen generally at the lower end of said well casing, said apparatus including steam generating means for providing steam generally at the area of said well screen, and a sleeve disposed adjacent to said well screen, said sleeve being generally parallel with said well screen and defining an open lower end for allowing discharge of said steam, said means for providing steam generally at the area of said well screen including a pipe within said sleeve, concentric with said sleeve and terminating adjacent to said open end of said sleeve, said sleeve defining at least one window at the upper end thereof, said sleeve being of less diameter than said well casing for allowing fluid circulation between said sleeve and said well casing.

12. Apparatus for cleaning a well, said well including a well casing, and a well screen generally at the lower end of said well casing, said apparatus including steam generating means for providing steam generally at the area of said well screen, and a sleeve disposed adjacent to said well screen, said sleeve defining an open lower end for allowing discharge of said steam, said sleeve defining at least one window at the upper end thereof, said sleeve being of less diameter than said well casing for allowing fluid circulation between said sleeve and said well casing, and further including means for adding chemicals into said steam.

13. Apparatus as claimed in claim 12, and further including capping means for closing said well casing for containing steam injected into said well casing.

14. Apparatus as claimed in claim 12, and further including a steam line for conducting said steam to said well screen, and a nozzle selectively receivable on said steam line for directing steam and chemicals against the interior of said well casing and said well screen.

* * * * *